(12) United States Patent
Greubel et al.

(10) Patent No.: US 6,199,440 B1
(45) Date of Patent: Mar. 13, 2001

(54) SPINDLE DRIVE UNIT

(75) Inventors: Roland Greubel, Ramsthal; Joachim Kunkel, Habichsthal, both of (DE)

(73) Assignee: Deutsche Star GmbH, Schweinfurt (DE)

( * ) Notice: Subject to any disclaimer, the term of this patent is extended or adjusted under 35 U.S.C. 154(b) by 0 days.

(21) Appl. No.: 09/149,801

(22) Filed: Sep. 8, 1998

(30) Foreign Application Priority Data

Sep. 8, 1997 (DE) .............................................. 197 39 216

(51) Int. Cl.⁷ .................................................. F16H 27/02
(52) U.S. Cl. .............................................. 74/89.15; 74/459
(58) Field of Search .......................... 74/459, 424, 89.15; 15/256.5; 403/337, 408.1, 294, 362, 397; 277/29

(56) References Cited

U.S. PATENT DOCUMENTS

| | | |
|---|---|---|
| 2,548,848 | 4/1951 | Stechmann . |
| 2,793,538 * | 5/1957 | Sears ....................................... 74/459 |
| 2,818,745 | 1/1958 | Spontelli . |
| 2,982,145 | 5/1961 | Orner . |
| 3,643,521 | 2/1972 | Nilsson . |
| 3,669,460 | 6/1972 | Nysong . |
| 4,053,167 * | 10/1977 | Jelinek ............................... 74/459 X |
| 5,664,459 | 9/1997 | Mühleck et al. . |
| 5,722,294 | 3/1998 | Kobayashi et al. . |

FOREIGN PATENT DOCUMENTS

| | | |
|---|---|---|
| 71 37 781 | 11/1972 | (DE) . |
| 25 40 942 | 3/1977 | (DE) . |
| 28 22 560 | 11/1979 | (DE) . |
| 29 28 717 | 1/1981 | (DE) . |
| 252 994 | 1/1988 | (DE) . |
| 36 41 682 | 6/1988 | (DE) . |
| 39 02 273 | 8/1990 | (DE) . |
| 57-85648 | 11/1955 | (JP) . |
| 48-263 | 1/1973 | (JP) . |
| 60-164158 | 8/1985 | (JP) . |
| 63-171757 | 11/1988 | (JP) . |
| 4-285352 | 10/1992 | (JP) . |
| 6-47762 | 6/1994 | (JP) . |

* cited by examiner

Primary Examiner—David A. Bucci
Assistant Examiner—Colby Hansen
(74) Attorney, Agent, or Firm—Baker Botts L.L.P.

(57) ABSTRACT

A spindle drive unit includes a spindle having a spindle axis and an external circumferential surface and a nut embracing the spindle and being in threaded engagement with the spindle. In an axial end portion of the nut a wiper assembly is removably fixed to the nut. The wiper assembly has at least one sealing ring in wiping engagement with the external circumferential surface of the spindle. The wiper assembly is removably connected to an adapter in a rotationally fixed manner, the adapter in turn being directly and removably connected to the nut in an axially and rotationally fixed manner. The use of the adapter enables the wiper assemblies of various constructions or with different numbers of sealing rings to be attached to a conventional nut.

51 Claims, 11 Drawing Sheets

SPINDLE DRIVE UNIT

BACKGROUND OF THE INVENTION

1. Field of the Invention

This invention relates to a spindle drive unit comprising a spindle having a spindle axis and an external circumferential surface, a nut embracing said spindle and being in threaded engagement with said spindle and at least one wiper assembly comprising at least one wiper member in wiping engagement with said external circumferential surface of said spindle, said wiper assembly being removably fastened to said nut in an axial end portion thereof.

2. Description of the Prior Art

A spindle drive unit like this is known from the DE 28 22 560 A1. In this known solution the wiper assembly comprises a sealing ring attached to the internal circumference of a sleeve. The sealing ring sealingly abuts on the back of an external thread of the spindle. The sealing ring is permanently riveted to the sleeve. The wiper assembly consisting of the sealing ring and the sleeve may be fixed to the nut when the nut is mounted on the spindle. For this purpose an axially projecting tubular socket is welded on the nut. The sleeve of the wiper assembly supporting the sealing ring is pushed on said tubular socket. Then the wiper assembly is manually adjusted in the axial direction with respect to the tubular socket until the sealing ring is optimally positioned on the back of the external thread of the spindle. After adjusting the wiper assembly, it is axially and circumferentially fixed to the tubular socket by means of pins and a clamp strap.

For this known solution an adaptation of the nut is necessary to be able to mount the wiper assembly. The nut has to be subjected to a welding process to attach the tubular socket to it. If a conventional nut, which can be obtained as a component of mass production, is to be used, it is often completely impossible to weld a tubular socket from the outside on the nut. Often the material of the nut or the components connected therewith do not allow welding of a tubular socket, for example due to high sensitivity to heat, great danger of deformation or poor welding properties. This especially applies to precision spindle drive units, which are used in machine tools or measuring devices. Moreover, welding is a comparatively extensive and difficult process as the tubular socket has to be positioned exactly in the radial direction in order to guarantee uniform abutment relations of the sealing ring at the back of the spindle thread across the entire circumference. Even in conventional nuts often no suitable place for welding the tubular socket is found for reasons of design or space. Finally, the tubular socket is no longer removable from the nut after welding so that the nut is assigned to a certain purpose of application and can no longer be used for other applications in which a wiper assembly axially attached from the outside is under certain circumstances not necessary anymore. In this case the welded tubular socket would be disturbing and require unnecessary space.

From U.S. Pat. No. 3,643,521 there is known a further spindle drive unit having a spindle and a nut being in threaded engagement with the spindle. In a mounted state of the nut a sealing ring can be attached to the nut from axially outside. The sealing ring engages with a threaded groove in the external circumferential surface of the spindle and is screwed on the spindle from one end of the spindle. A plurality of axially oriented peg receiving holes are provided in an axial end face of the nut distributed along the circumference. Similar peg receiving holes are also provided in the sealing ring. If the sealing ring, when mounted on, is turned into its desired axial position relative to the nut, the peg receiving holes in the sealing ring and the nut are aligned and then equipped with pegs which keep the sealing ring to the nut without being able to be turned. By means of a pretensioning member supported on the nut the sealing ring is axially biased away from the nut against the turn of the spindle thread.

Even in the solution according to DT 20 01 558 a conventional and commercially available nut cannot readily be used to attach the sealing ring. It is rather that the nut has to be purposefully machined to create the preconditons for mounting the sealing ring. For the peg receiving holes have to be drilled which causes an additional expenditure of work. Moreover the mounting of the sealing ring is extraordinarily laborious since the sealing ring has to be held against the action of the pretensioning member relative to the nut to be able to insert the individual pegs into the peg receiving holes which have been brought in alignment.

SUMMARY OF THE INVENTION

It is an object of the present invention to enable simple mounting of a wiper assembly on a nut in a spindle drive unit, largely avoiding special measures of adaptation at the nut.

To achieve this object the present invention provides a spindle drive unit, comprising a spindle having a spindle axis and an external circumferential surface, a nut embracing said spindle and being in threaded engagement with said spindle and at least one wiper assembly comprising at least one wiper member in wiping engagement with said external circumferential surface of said spindle, said wiper assembly being removably fastened to said nut in an axial end portion thereof, wherein said wiper assembly, for its fastening to the nut, is removably connectable with an adapter in a rotationally fixed manner, said adapter being removably connectable with said nut in an axially and rotationally fixed manner.

The adapter free of wiping tasks forms an interface member between the nut and the wiper assembly. The adapter is a component physically distinct from the nut and the wiper assembly—or a constructional unit. Said component or constructional unit may on the one hand be optimally adapted to the fastening possiblities of the nut, preferably of a conventional nut. This means that the adapter can be designed in such a way that it may be fixed to the nut without specially machining the nut, for example providing a welded tubular socket or bores. Thus, the nut can also be used for applications in which the wiper assembly and the adapter are not desired or not necessary. On the other hand, the adapter may be optimally adapted to the fastening possiblities present at the wiper assembly. For it has to be considered that in designing the wiper assembly first of all its wiping funciton is of importance. Therefore in fixing the wiper assembly it always has to be considered that its wiping function is optimally guaranteed. The adapter solves the obvious conflict of goals between a simple, however operatively secure fixing of the wiper assembly with at the same time an optimally ensured wiping function and the desired intactness of the nut so that a commercially available nut can be used requiring no subsequent treatment.

With respect to mounting it is favourable when at least the wiper member may be mounted on and dismounted from said nut in a mounting state of said nut in which said nut is mounted on said spindle. Then the spindle does not have to be dismounted from its spindle bearings in order to be able to fix the wiper member to the nut with interposition of the adapter. It is advisable that said adapter, in said mounting state of said nut, may also be mounted on or dismounted from said nut.

The mounting of the spindle drive unit is further simplified when at least a part of said wiper assembly including the wiper member and said adapter may be premounted to form a constructional unit and may be attached to said nut in the form of said constructional unit. In this case it is again favourable when the premounted constructional unit which comprises said wiper member and said adapter may be mounted on and dismounted from said nut in a mounting state of said nut in which said nut is mounted on said spindle.

A laborious axial positioning of the adapter relative to the nut is avoided when first cooperating axial abutment means are provided on said adapter and on said nut, respectively, and define an axial position of said adapter relative to said nut. Preferably said wiper member is connectable with said adapter in an axially fixed manner. The mounting of the wiper member on said adapter may be facilitated by the fact that second cooperating axial abutment means are provided on said wiper assembly and on said adapter, respectively, and define an axial position of said wiper member relative to said adapter.

It is advisable that separate fixing members are provided for fixing said adapter to said nut and for fixing said wiper assembly to said adapter. Thus, for different nuts or/and different wiper assemblies the suitable fastening members can be chosen, respectively.

If the wiper assembly comprises a wiper member which engages with a threaded groove at the external surface of the spindle the wiper assembly can usually not be axially pushed on the spindle for mounting purposes. Rather it has to be screwed on the spindle. A simple mounting of the spindle drive unit without the expense of adjusting can be guaranteed by the fact that fixing members are provided for fixing said adapter to said nut, said fixing members allowing fixation of said adapter independent from a rotary position of said adapter relative to said nut.

It is conceivable that for different wiper assemblies individual types of adapters are present. An essential idea of the invention is, however, to supply a universal adapter which is adapted for selectively fastening different wiper assemblies. The difference of the wiper assemblies can lie in a different number or/and design of their wiper members. The adapter can have different attachment locations for different wiper assemblies. Preferably, however, it is provided that for attaching a wiper assembly said adapter has attachment locations which are equal for different wiper assemblies.

The wiper assembly can comprise at least two physically distinct wiper members. At least a part of said wiper members can be in axially consecutive wiping engagement with said external circumferential surface of said spindle. The wiper members can take over different functions so that a highly effective wiper assembly can be realized, perfectly sealing the nut against the outside. Therefore it is conceivable that two wiper members in axially consecutive wiping engagement with said external circumferential surface of said spindle differ with respect to their wiping effect. It is expedient that a wiper member which is in wiping engagement with said external circumferential surface of said spindle more remote from an axial center portion of said nut forms a secondary wiper with a coarse wiping effect and a wiper member which is in wiping engagement with said external circumferential surface of said spindle closer to said axial center portion of said nut forms a primary wiper with a fine wiping effect.

For enhancing the sealing of the nut there can be provided that in said axial end portion of said nut at least one additional wiper member separate from said wiper assembly is fixed or may be fixed to said nut. It is suitable when said additional wiper member will be or may be fixed to said nut closer to an axial center portion of said nut than said wiper assembly. For accommodating said additional wiper member a wiper member receiving groove can be formed on said nut. In standard nuts the wiper member receiving groove is often formed as an annular groove into which a sealing ring as an additional wiper member may be inserted. Thus it is left to the user of the spindle drive unit to mount an additional sealing ring on the nut in addition to the the wiper assembly or to leave it out.

In a preferred embodiment there is provided that said adapter has a mounting surface axially directed away from said nut for fixing said wiper assembly. A plurality of axial fixation bores can be formed in said mounting surface for accommodating fastening bolts serving for the fixation of said wiper assembly to said mounting surface of said adapter, said fixation bores being distributed along the circumferential direction with respect to the spindle axis. At least a part of said fixation bores can be formed as blind holes. Alternatively or additionally at least a part of said fixation bores may axially traverse said adapter enabling to insert fastening bolts into said fixation bores from both sides of the adapter.

A fixation of the adapter to the nut in the radial direction can be achieved in that said adapter has at least one support projection substantially directed in the axial direction of said spindle towards said nut. The support projection serves for centering the adapter on the nut. If desired, such a support projection can also be provided for the fixation of the adapter in the circumferential direction. The support projection can be formed as an annular rib or rib segment. Expediently, said nut has at least one support seat for accommodating said support projection. Said support seat can be radially defined by an internal circumferential surface of said nut. In standard nuts a ring-shaped gap in the area of their axial ends is often present between the external circumferential surface of the spindle and the internal circumferential surface of the nut. The support projection of the adapter can be inserted into this radial gap, so that the support projection is in supporting engagement with the internal circumferential surface of the nut.

Preferably the adapter substantially entirely embraces the spindle, wherein the adapter can suitably be formed as a ring member. A simple and quick mounting of the adapter on the nut is rendered possible in that said adapter is circumferentially separated by a slot, the width of said slot being variable by means of width variation means, wherein said adapter is clampable to said nut by varying the width of said slot. Modifications at the nut in the form of subsequent machining of the same are not necessary in this type of mounting since the adapter, when suitably designed, can substantially be clamped to any surface of the nut. Said width variation means can be formed as slot constricting means. Thus, the adapter can be clampable against an external circumferential surface of said nut. It is also possible that said width variation means are formed as slot enlarging means and said adapter is clampable against an internal circumferential surface of said nut. As a rule an external or internal circumferential surface suited to clamp the adapter is present in conventional nuts.

In a preferred solution, characterized by a small number of components and reliable and simple handling, the width variation means comprise a width variation screw which is insertable into a bore in said adapter, which bore opens into a slot defining surface of said slot. Since under certain circumstances it can be difficult to cut a thread into the bore, for example because the wall thickness around the bore is too thin, there is preferably provided that in said slot a physically distinct threaded nut is retained which may be brought into threaded engagement with said width variation screw. For exact positioning of the threaded nut it is advisable that said threaded nut is arranged in a recess in a slot defining surface of said slot.

An alternative type of mounting the adapter on the nut can be that said adapter may be hooked to said nut by means of a hook arrangement. Said hook arrangement preferably comprises at least two fixation hooks cirumferentially distributed with respect to said spindle axis. Said fixation hooks are suitably adapted for engaging with a hooking recess of said nut. Favourably, the hooking recess can be formed of a circumferential groove in an internal circumferential surface or an external circumferential surface of said nut. Such a circumferential groove is often present in conventional nuts and can be used without additional working measures for hooking the adapter.

In a preferred embodiment the fixation hooks are formed as pivot hooks being supported by said adapter and pivotable between a release position and a hook position. For moving said pivot hooks from their release position into their hook position said adapter can be provided with a pivot arrangement acting on a pivot end opposite to a hook end of each of said pivot hooks. A hooking of the adapter on the nut which is readily releasable, but is nevertheless safe, can be guaranteed in that said pivot arrangement comprises a pivot screw for each of said pivot hooks which is insertable into a threaded bore of said adapter and acts on said pivot end of the respective pivot hook.

A space-saving and protected accommodation of the fixation hooks can be that each of said fixation hooks is accommodated in a respective hook pocket of said adapter and projects from said hook pocket with a hook end.

For reasons of strength and for easy machinability the adapter is preferably made of metal, wherein a particularly light weight of the adapter is guaranteed by the use of aluminum. It can be seen, however, that the adapter can also be made of plastics material, for example as an injection moulded part.

Possible leaks between the adapter and the nut can be eliminated in that an abutment surface of said adapter provided for abutment on said nut is at least partly coated with a cover material. The cover material can consist of vulcanized rubber or injected plastics material and preferably has a certain elasticity, so that it can completely fill the leaks between the adapter and the nut. If the adapter has a slot it is advisable that also said slot is at least partly filled with a sealing material, preferably with a deformable sealing material, to prevent the penetration of contaminations through the slot. If in such a slit embodiment of the adapter the width of the slot for clamping the adapter is varied, it is favorable when the sealing material is able to adapt to the width variation, i.e. in case of a constriction of the slot the material is elastically compressible and in case of an enlargement of the slot it can extend into the additional volume of the slot.

According to a further embodiment of the invention there is provided that said wiper assembly comprises a wiper ring as a wiper member which is in seating engagement with said external circumferential surface of said spindle substantially over its entire internal circumference. A good sealing effect can be obtained when said wiper ring is mounted with a pretension radially biassing said wiper ring against said external circumferential surface of said spindle. A structurally simple type of the radial pretension of the wiper ring is that said wiper ring is circumferentially separated by a separation and may be biased by pretensioning means constricting said separation. Preferably there is provided that said separation is formed by a substantially axially oriented separation slit or separation cut being inclined relative to the radial direction. The inclination of the separation slit or separation cut relative to the radial direction has the effect in that the cirumferentially oppposite surfaces of the separation slit or separation cut slide along each other like wedge surfaces when the separation is constricted by means of the pretensioning means, thus reinforcing the pretension.

Said pretensioning means can comprise a pretensioning member having a pretensioning recess into which said wiper ring is insertable in order to be pretensioned. It can be provided that said pretensioning member is formed physically distinct from said adapter and comprises a pretensioning sleeve into which said wiper ring is insertable. As an alternative it can be provided that said pretensioning member is formed by said adapter and said pretensioning recess is formed on said adapter.

The slit embodiment of the wiper ring not only allows its radial pretension but also the exchange of the wiper ring without dismounting the spindle from its spindle bearings. For the wiper ring can be bent up at its separation and then be drawn off the spindle at the thus emerging gap. A new wiper ring can be mounted in the same way in bending it up and slipping it on the spindle.

Plastics material is recommendable as a material for the wiper ring as it is sufficiently wear resistant, on the one hand, and has the necessary flexibility in order to bend up the wiper ring for mounting and dismounting it in the previously described manner, on the other end.

Not only for carefully removing contaminations from the external surface of the spindle but also to optimally seal the nut against the outside is it advisable that when said external circumferential surface of said spindle is formed with a threaded profile, said wiper ring has a complementary profile at its internal circumference engaging with said threaded profile.

Mounting is facilitated when said wiper ring may be fixed to said adapter by means of fastening members and support formations are assigned to said adapter and to said wiper ring allowing that said wiper ring is supported on said adapter even before attaching said fastening members. It can be provided that said support formations comprise at least two support members which, circumferentially distributed with respect to the spindle axis, are arranged or may be arranged at one of the members, i.e. wiper ring and adapter, and which project in the axial direction towards the respective other member and which are axially insertable into an opposing support recess in the respective other member. It is particularly favourable when said wiper ring is slit and said support members and said support recesses are localized on both members in the circumferential direction on both sides of the slot of said wiper ring such that said wiper ring may be supported on said adapter with radial constriction. A pretension of the wiper ring is achieved by means of said radial constriction. This pretension keeps the wiper ring to the adapter as long as the fastening member are not yet attached.

A simple way of fastening the wiper member to the adapter is that said wiper member is axially traversed by at least two through bores for accommodating fastening bolts serving for fixing said wiper member to said adapter, said through bores being circumferentially distributed with regard to the spindle axis. It is conceivable to first of all fix the adapter to the nut and then to attach wiper members according to one's wishes to the adapter by means of the fastening bolts. If the wiper assembly comprises a plurality of wiper members the fastening bolts can traverse all of these wiper members. If the the fastening bolts in the final mounting state of the spindle drive unit are accessible from the outside, it is possible to subsequently add further wiper members to the wiper assembly or remove individual wiper members from the wiper assembly or replace them by other wiper members without removing the adapter from the nut.

For reasons of sealing and costs the wiper ring will often be made of plastics material which, however, is in danger of being pinched if the fastening bolts are overtightened. If the wiper member is made of material endangered of being pinched, in particular plastics material, it is favourable when in the through bores of which a spacer sleeve, preferably made of metal, is inserted which on the one end is supported by said adapter and on the other end is adapted for receiving clamping forces exerted by the respective fastening bolt.

Besides a sealing ring said wiper assembly can also comprise a wiper brush as a wiper member substantially embracing said spindle. The wiper brush brushes off the external surface of the spindle with a plurality of brush bristles. Further said wiper assembly can comprise a groove scraper as a wiper member which has at least one scraping projection engaging with a threaded nut in said external circumferential surface of said spindle. The wiper brush as well as the groove scraper primarily serve for brushing rough contaminations off the external surface of the spindle. Advantageously, they are supplemented by a primary wiper which also removes fine contaminations from the external surface of the spindle. Said primary wiper can be part of the wiper assembly or can be directly attached to the nut as a sealing member separate from the wiper assembly.

Further, the wiper assembly can comprise at least one cover member for said at least one wiper member. The cover member can be formed as a cover disk or cover plate, preferably made of sheet metal. The cover member serves to protect the wiper member(s) from hot chips which can accumulate in machine tools during machining workpieces. Further the cover member prevents the collection of other contaminations, such as dust, on the wiper member or the wiper members, and also offer proctection from aggressive chemicals, coolants or lubricants.

The solution in accordance with the invention is preferably used for a spindle drive unit, in which said spindle has at least one threaded groove in its external circumferential surface extending helically about said spindle axis. When forming the spindle drive unit as a rolling element screw drive unit, in particular ball screw drive unit, there is provided according to a preferred embodiment that in an internal circumferential surface of said nut at least one rolling-element-containing nut groove is formed which extends helically about said spindle axis and comprises two end portions, said nut groove together with said external circumferential surface of said spindle defining a helical rolling element path extending between said two end portions, said helical rolling element path being supplemented by a rolling element return path in said nut extending between said two end portions to form a closed rolling element circulating path, said rolling element circulating path being equipped with an endless row of rolling elements which on the one hand engage with said nut groove and on the other hand with a helical track surface of said external circumferential surface of said spindle.

According to a further aspect the invention relates to a kit for retrofitting a spindle drive unit, said spindle drive unit comprising a spindle having a spindle axis and an external circumferential surface as well as a nut embracing said spindle and being in threaded engagement with said spindle, wherein said kit comprises: at least one adapter which is removably connectable with said nut in an axial end portion of said nut in an axially and rotationally fixed manner, and at least one wiper assembly which is removably connectable with said adapter in a rotationally fixed manner and comprises at least one wiper member for wipingly engaging with said external circumferential surface of said spindle. This kit enables to subsequently equip a conventional spindle drive unit with a wiper assembly, wherein the adapter may be adapted to the nut with respect to its design, so that the nut does not have to be machined for attaching the wiper assembly. Different adapters or/and different wiper assemblies can be provided, so that for any desired application of the spindle drive unit and for any size and design of the spindle drive unit a suitable kit for retrofitting can be provided. The adapter and the individual members of the wiper assembly can be formed in the way described above.

According to a further aspect the invention relates to a motion system comprising at least two members being movable relative to each other, at least one wiper assembly being retained on at least one of said members, said wiper assembly being in wiping engagement with the respective other member.

In accordance with the invention in such motion system there is provided that said wiper assembly being retained on said one of said members by means of an adapter, said adapter being on the one hand fixedly, however, removably connectable with said one of said members and on the other hand fixedly, however, removably connectable with said wiper assembly.

The interconnection of an adapter may not only be applied with advantage in a motion system in which the two members are linearly movable relative to each other, as is for example the case in a linear guide device comprising a carriage guided for longitudinal movements on a guide rail, in particular profile rail, or comprising a ball bush guided lengthwise or in spherical liners guided lengthwise on a shaft. In the same way the two members can be rotable relative to each other, in particular screwable, as is for example the case in the above described spindle drive unit.

DESCRIPTION OF THE PREFERRED EMBODIMENTS

Figure 1:
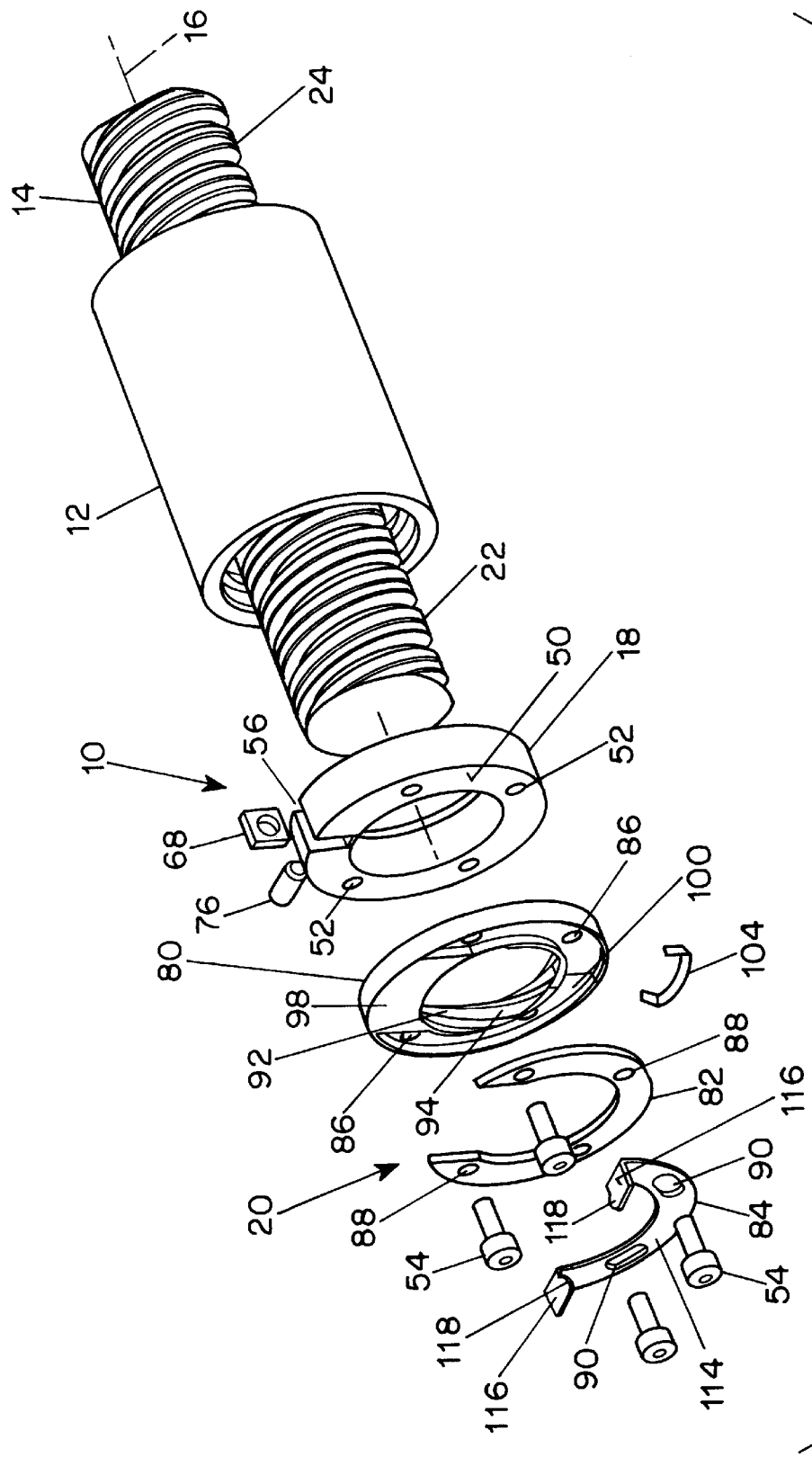
FIG. 1 shows a perspective exploded view of a first embodiment of the spindle drive unit according to the invention.
Figure 2:
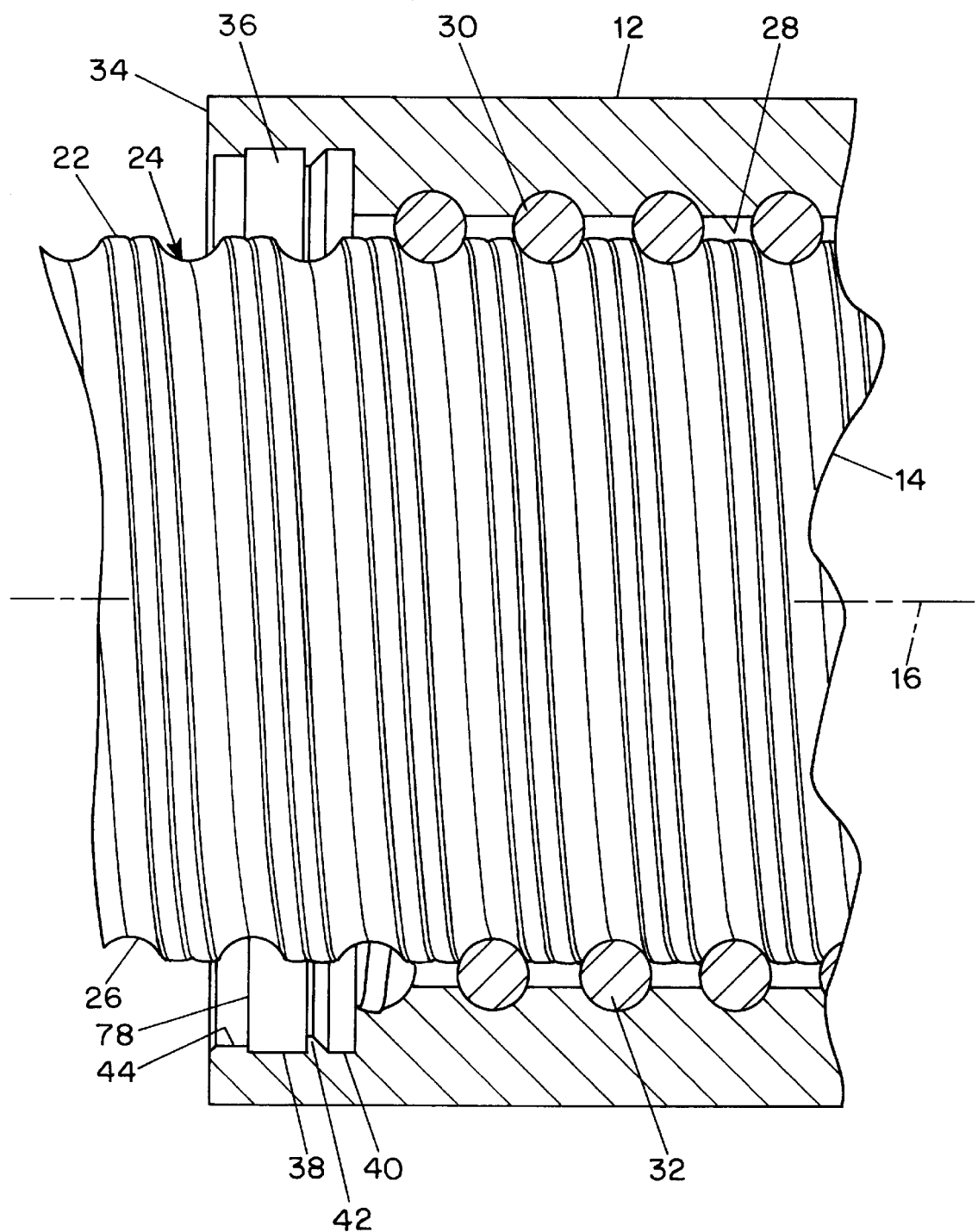
FIG. 2 shows a spindle and a longitudinal section of a nut of the spindle drive unit of FIG. 1 mounted on the spindle.

FIG. 1 illustrates a ball screw drive unit generally designated 10, a nut 12, a threaded spindle 14 comprising a spindle axis 16, an adapter 18 which can be fixed to the nut 12 with an axial end, and a wiper assembly generally designated 20 which can be fixed to the adapter 18 with its side axially remote from the nut 12. As regards the design of the threaded spindle 14 and the nut 12 being in threaded engagement therewith, reference is made to FIG. 2. The threaded spindle 14 has a screw thread 24 worked into the external circumferential surface 22 of the spindle 14. In the illustrated example the screw thread 24 is a single thread and formed by an external thread groove 26 extending helically around the spindle axis 16. It goes without saying that the screw thread 24 of the threaded spindle can also be a multiple thread, for example a double thread. The nut 12 which annularly embraces the threaded spindle 14 also has at least one helically extending nut groove 30 in its internal circumferential surface 28. The nut groove 30 has, just as the thread groove 26 in the external circumferential surface 22 of the spindle, a substantially semi-circular cross-section. The nut groove 30 and the thread groove 26 together form a ball screw path which is supplemented by an axial return channel, which is not shown, in the nut 12 to form a closed ball circulating path with an endless row of balls 32 circulating therein.

Adjacent to an axial front surface 34 of the nut 12 there is a profiled recess 36 worked into its internal circumferential surface 28. Said profiled recess 36 comprises an annular groove 38 closer to the front surface 34 and an annular groove 40 further away from the front surface. The annular grooves 38, 40 are separated by an annular web 42. The annular groove 38 is delimited by an annular web 44 towards the front surface 34. The annular groove 40 serves for accommodating a circlip which is not shown and which can snap into the annular groove 40 and which secures a reversing member, which is also not shown, on the nut 12, which reverses the balls 32 in an axial end portion of the nut 12 between the ball screw path and the ball return channel.

Figure 4:
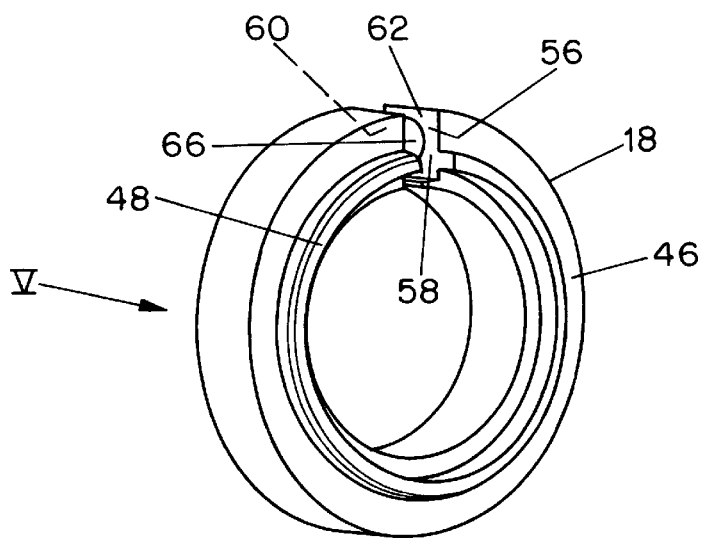
FIG. 4 shows a perspective view of an adapter of the spindle drive unit of FIG. 1.
Figure 5:
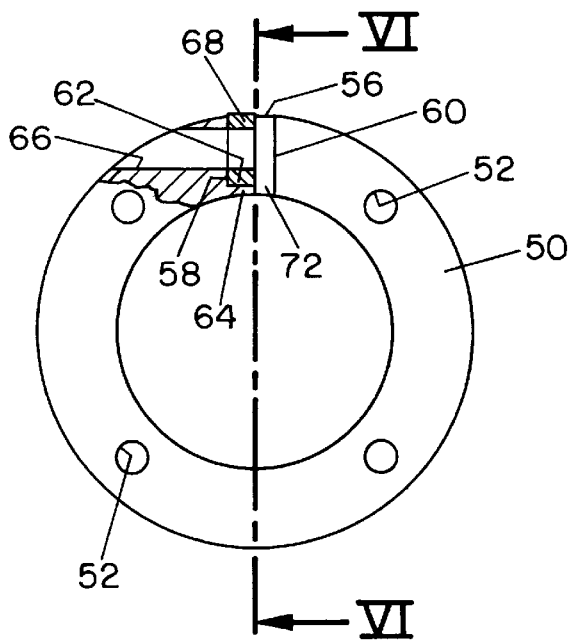
FIG. 5 shows a view of the adapter of FIG. 4 in the line of sight of an arrow V, wherein a threaded nut is inserted into a slot of the adapter and the slot is filled with a sealing material.
Figure 6:
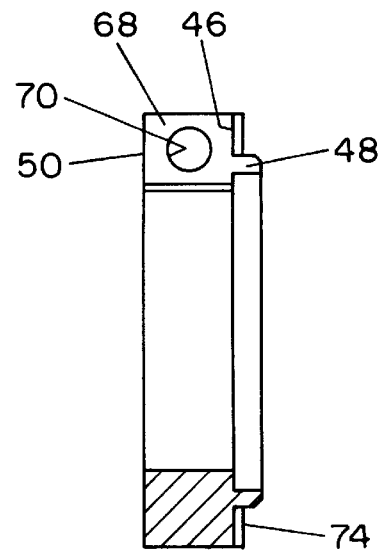
FIG. 6 shows a section along line VI—VI of FIG. 5.

The adapter 18 serving as carrier of the wiper assembly 20 is clampable on the nut 12 in any desired position of the rotational angle relative to the nut 12. In a mounting state in which it is clamped on the nut 12 the adapter 18 is fixed to the nut 12 in the axial direction as well as in the circumferential direction with respect to the spindle axis 16. Reference is made to FIGS. 4 to 6 for an explanation of the adapter 18. The adapter 18 is formed as an annular part the internal diameter of which is slightly larger than the external diameter of the spindle 14. Its external diameter almost corresponds to the external diameter of the nut 12 in its axial end portion adjacent to the front surface 34. Thus the adapter 18 in its mounting state is on the outside substantially even with the nut 12. On its side axially facing the nut 12 the adapter 18 has an axially directed, ring-shaped plane surface 46 which is determined for plane abutment on the axial front surface 34 of the nut 12. The plane surface 46 and the front surface 34 together form cooperating axial abutment means defining the axial position of the adapter 18 relativ to the nut 12. A ring-shaped support rib 48 projects from the plane surface 46 substantially in the axial direction. The ring-shaped support rib 48 fits into the recess 36 of the nut 12 when mounting the adapter 18 on the nut 12 and centers the adapter 18 at the internal circumferential surface 28 of the nut 12, i.e. at the internal circumferential surface of the annular web 44.

At its side axially facing away from the nut 12 the adapter 18 has a ring-shaped plane mounting surface 50 serving for attaching the wiper assembly 20. From the side of the adapter axially facing away from the nut 12 several, in the illustrated example four, axial fixation bores 52 are drilled into the mounting surface 50. The fixation bores are formed as threaded blind holes and are distributed about the mounting surface 50 at almost identical angular distances. They serve for accommodating fastening screws 54, shown in FIG. 1, and for fixing the wiper assembly 20 to the adapter 18.

The adapter 18, preferably made of aluminum, optionally of plastics material, is circumferentially separated by a slot 56 radially extending from the internal circumference to the external circumference of the adapter. The slot 56 axially traverses the adapter 18. It is defined by two opposing slot defining surfaces 58 and 60 in the circumferential direction. A recess 62 is worked into one of the slot defining surfaces, here into the slot defining surface 58, which extends through the adapter 18 in the axial direction and radially reaches from the external circumference of the adapter 18 to a web 64 circumferentially projecting into the slot 56. At the same time a bore 66 extending orthogonal to the slot defining surface 58 opens into the slot defining surface 58. The bore 66 is worked into the adapter 18 almost tangentially with respect to the circumferential direction from the external circumference.

For clamping the adapter 18 to the nut 12 a threaded nut 68 is inserted into the recess 62 so that it rests on the web 64 and abuts on the recessed part of the slot defining surface 58. The threaded nut 68 comprises a threaded hole 70 which is in alignment with the bore 66 when the threaded nut 68 is inserted. The volume of the slot which remains after the nut 68 has been inserted into the recess 62 is then filled with an at least limitedly elastical sealing material 72. The sealing material 72 prevents contaminations from penetrating into the interior of the adapter 18 from outside the adapter 18 and retains the nut 68 in the recess 62. Preferably the sealing material 72 is injected around the nut 68 so that the nut 68 is not only retained at the slot defining wall 58 through the sealing material 72 but is also radially and axially secured against losening. At the same time with filling the slot 56, the plane surface 46 is at least radially outside the support rib 48 also coated with a sealing material 74 which, in the mounting state of the adapter 18, forms a sealing coat between the plane surface 46 and the axial front surface 34 of the nut 12. Said sealing coat seals the connecting point formed between the adapter 18 and the nut 12 against the penetration of dirt and against the leakage of lubricant and compensates for irregularities in the plane surface 46 or/and in the axial front surface 34. The slot filling 72 and the sealing coat 74 are formed during one working process, if desired continuously. The sealing and/or filling material used in the this process can be a rubber material, applied and vulcanized on the adapter 18. However, it is also conceivable to apply a plastics material in an injection molding process.

The adapter 18 thus prepared is axially applied to the front surface 34 of the nut 12. The support rib 48 engages—as has already been described—with the recess 36 at the internal circumference of the nut 12. Then an attachment screw 76 (s. FIG. 1) is inserted into the bore 66, which has no thread, and screwed into the threaded nut 68. The attachment screw 76 is screwed into the threaded nut 68 so far that it sinks in the slot filling 72 with its end screwed in at first. If the attachment screw 76 is further screwed into the treaded nut 68, which is retained in the recess 62 so that it cannot be turned, the fastening screw 76 finally presses against the slot defining surface 60 to such an extent that the adapter 18 widens. It is possible that the fastening screw 76 cuts through the material of the slot filling 72 thus getting in direct contact with the slot defining surface 60. It is also possible that the fastening screw 76 presses into the slot filling 72 without affecting it. Due to the radial widening of the adapter 18 the support rib 48 is radially pressed against the top surface, designated 78, of the annular web 44 until finally a friction-tight engagement is obtained between the support rib 48 and the annular web 44 which not only fastens the adapter 18 to the nut 12 in the circumferential direction but also prevents an axial removal of the adapter 18 from the nut 12.

The radial widening of the adapter 18 is accompanied by an enlargement of the width of the slot 56, i.e. the volume of the slot increases. The sealing material used for the slot filling 72 preferably has an elasticity which compensates for the increase in volume of the slot 56 and which enables it to expand into the additional volume of the slot arising when the adapter 18 widens. This is advantageous in preventing contaminations to penetrate or lubricant from leaking through the additional volume of the slot. Further the threaded nut 68 is always tightly kept in the recess 62.

In order to remove the adapter from the nut 12 it is sufficient to release the attachment screw 76 which, in turn, again radially constricts the adapter 18 since it was only elastically and not plastically deformed by the previous radial widening. This loosens the press fit between the support rib 48 and the annular web 44 allowing to axially remove the adapter 18 from the nut 12. It can easily be seen that the adapter 18 when the nut 12 is mounted on, i.e. when it is screwed onto the spindle 14, can be mounted on and dismounted from the nut 12 as the adapter 18 can simply be axially applied on the nut 12 from the outside. When the adapter 18 has a suitable design, e.g. when the adapter 18 can be opened by means of a joint or consists of a sufficiently elastically deformable material, it can be conceivable to not only push the adapter 18 axially from one spindle end of the spindle 14 onto the spindle 14 but also to radially slip it on the spindle 14 or remove it from the spindle 14.

Again reference is made to FIG. 1. The wiper assembly comprises a sealing ring 80 engaging with the thread 24 of the spindle 14, a cover plate 82 protecting the sealing ring 80 for example from hot chips as well as a groove scraper 84 roughly prepurifying the thread 24 of the spindle 14. The components sealing ring 80, cover plate 82 and groove scraper 84 may be fixed to the mounting surface 50 of the adapter 18 by means of the fastening screws 54. The sealing ring 80 comprises a set of through bores 86, the number of which corresponds to the number of the blind bores 52 of the adapter 18 and which are distributed about the circumferential direction just as the blind bores 52, so that they may be axially aligned with the blind bores 52. The through bores 86 do not have a thread. Even the cover plate 82 has a set of through bores 88 which may be axially aligned with the through bores 86 and the fixation bores 52. Eventually the groove scraper 84 comprises receiving holes 90 which are elongated in the circumferential direction and may be axially aligned with the through bores 88 of the cover plate 82. As in the example illustrated in FIG. 1 the groove scraper 84 only has a semi-circular basic design, it only has two receiving holes 90, whereas both the cover plate 82 and the sealing ring 80 each have four through bores 88 and 86, respectively. For mounting the wiper assembly two of the fastening screws 54 are inserted through respective through bores 88 in the cover plate 82 and through respective through bores 86 in the sealing ring 80 and screwed into respective fixation bores 52 in the adapter 18. For attaching the groove scraper 84 two other fastening screws 54 are additionally inserted through the receiving holes 90 thereof and screwed into the remaining two fixation bores 52 of the adapter 18.

The sealing ring 80 comprises an internal circumferential surface 92 which has a threaded profile 94 being complementary to the thread 24 of the spindle 14. On its side axially facing the adapter 18 the sealing ring 80 has an axially directed abutment surface 96 (cf. FIG. 3) for abuting to the mounting surface 50 of the adapter 18. On its side axially facing away from the adapter 18 the sealing ring 80 has an axially directed front surface 98 into which a receiving recess 100 adapted to the contour of the cover plate 82 is worked. The cover plate 82 can be positively inserted into said receiving recess 100 so that it fits evenly into the part of the front surface 98 of the sealing ring 80 recessed by the recess 100. The cover plate 82 is formed as a segment ring, but it can also have any other shape which sufficiently protects the sealing ring 80 from damage. The sealing ring 80 is formed of plastics material, e.g. injection moulded. Preferably the cover plate 82 consists of sheet steel, however, if desired, it can also consist of other metal, e.g. brass or aluminum, or of a suitable shock- and heat-resistant plastics material.

Figure 7:
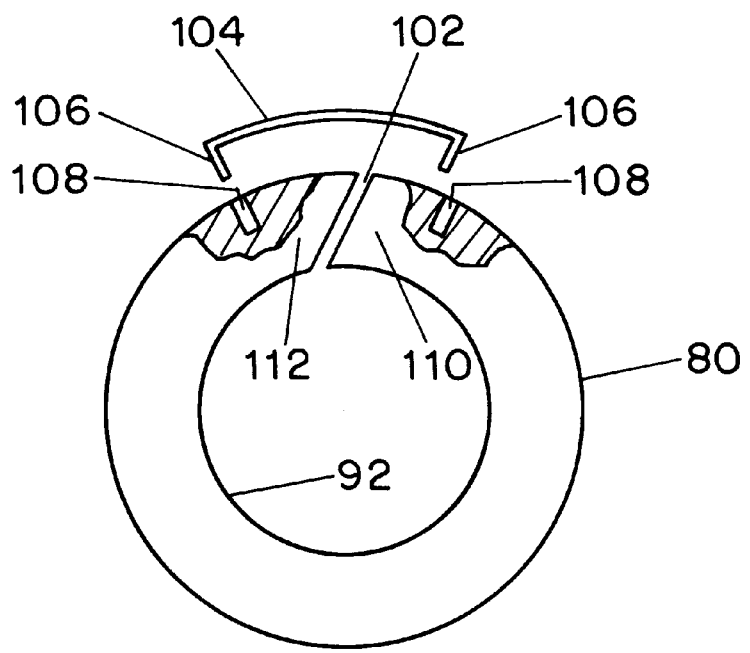
FIG. 7 shows a sealing ring and pretensioning clamp of the spindle drive unit of FIG. 1.

The sealing ring 80 is slit. In this context reference is made to FIG. 7 which shows a somewhat simplified top view of the sealing ring 80. A separating slot 102 extending diagonally with respect to the radial direction separates the sealing ring 80 at a circumferential location. Substantially the separating slot 102 is oriented in the axial direction. As the slot 102 is constricted a radial pretension of the sealing ring 80 is obtained radially biassing the sealing ring 80 in its mounted state against the external circumferential surface 22 of the spindle 14. It turned out that radial pretension considerably improves the sealing and/or wiping effect of the sealing ring 80. In order to bias the sealing ring 80 the slot 102 has to be constricted and thus the sealing ring 80 is radially constricted. For constricting the separating slot 102 FIGS. 1 and 7 show a pretensioning clamp 104 which extends like a bow in the circumferential direction over the separating slot 102 and, with its bent up ends 106 of the bow, is insertable in insert holes 108 arranged on both sides of the separating slot 102 with respect to the circumferential direction. The mutual distance of the insert holes 108 in the circumferential direction is chosen in such a way that when the pretensioning clamp 104 is inserted the separating slot 102 is constricted or even closed to such an extent that the desired pretension of the sealing ring 80 is obtained. The diagonal course, i.e. with respect to the radial direction, of the separating slot 102 is of advantage as the two cutting edges defining the separating slot 102 and lying opposite of each other in the circumferential direction act as wedge surfaces when the separating slot 102 is completely closed by means of the pretensioning clamp 104 or any other suitable pretensioning means. The wedge angle of the wedge surfaces is chosen so that is does not lie in the range of self-locking. When closing the separating slot 102 the two wedge surfaces slide along each other which leads to the fact that a slot edge portion 110 of the sealing ring 80 which in FIG. 7 is shown on the right side radially moves towards the inside relative to a slot edge portion 112 of the sealing ring which in FIG. 7 is shown on the left side, thus intensifying the pretension of the sealing ring 80.

Due to the radial constriction of the sealing ring 80 during its pretension the through bores 86 in the sealing ring 80 are offset transversely with respect to the axial direction by a small degree relative to the fixation bores 52 in the adapter 18. Therefore it is advisable that the through bores 86 in the sealing ring 80 have a somewhat larger cross-section than the threaded portions of the fastening screws 54, so that a clearance is formed between the fastening screws 54 and the through bores 86. It turned out that usual tolerances which cannot be avoided when drilling holes into plastic or metal parts are often sufficient to guarantee the desired small clearance between the fastening screws 54 and the through bores 86.

The groove scraper 84 is preferably formed as a bent sheet metal part. It has a semi-circular fixation portion 114 including the receiving holes 90 and at least one axially bent up scraper portion 116 at one end of the fixation portion 114. For a single thread 24 of the spindle 14 one scraper portion 116 is enough. The scraper portion 116 is formed with an almost crescent-like scraper projection 118 which is adapted to the cross sectional contour of the threaded groove 26 of the spindle 14. In the example illustrated in FIG. 1 the groove scraper 84 has two scraper portions 116 the scraper projections 118 of which are determined to engage in a double thread of a spindle and which diametrically lie opposite each other. The design of the receiving holes 90 as long holes enables to adjust the groove scraper 84 relative to the adapter 18 in the circumferential direction in order to achieve optimum engagement of the scraper projections 118 with the thread 24 of the spindle 14.

The spindle drive unit of FIG. 1 is assembled in the following way: First the nut 12 is mounted on the spindle 14 as is already shown in FIG. 1. Then the individual components of the wiper assembly 20 are attached to the adapter 18 by means of the fastening screws 54. At that time the pretensioning clamp 104 does not yet have to be attached to the sealing ring 80, however, this may not be excluded. The premounted constructional unit consisting of adapter 18, sealing ring 80, cover plate 82 and groove scraper 84 is then mounted on the nut. Said constructional unit is screwed onto the spindle which is necessary as the threaded profile 94 of the sealing ring 80 engages with the thread 24 of the spindle 14. The constructional unit is screwed so close to the nut 12 until the adapter 18 abuts with its plane surface 46, i.e. the sealing coat 74, on the front surface 34 of the nut 12. In tightening the attachment screw 76 the adapter 18 and the wiper assembly 20 are fixed to the nut 12. Afterwards the pretensioning clamp 104 is mounted in order to bias the sealing ring and the spindle 14 is mounted to respective spindle bearings at its spindle ends. The spindle drive unit 10 is dismounted in the reverse order.

Figure 3:
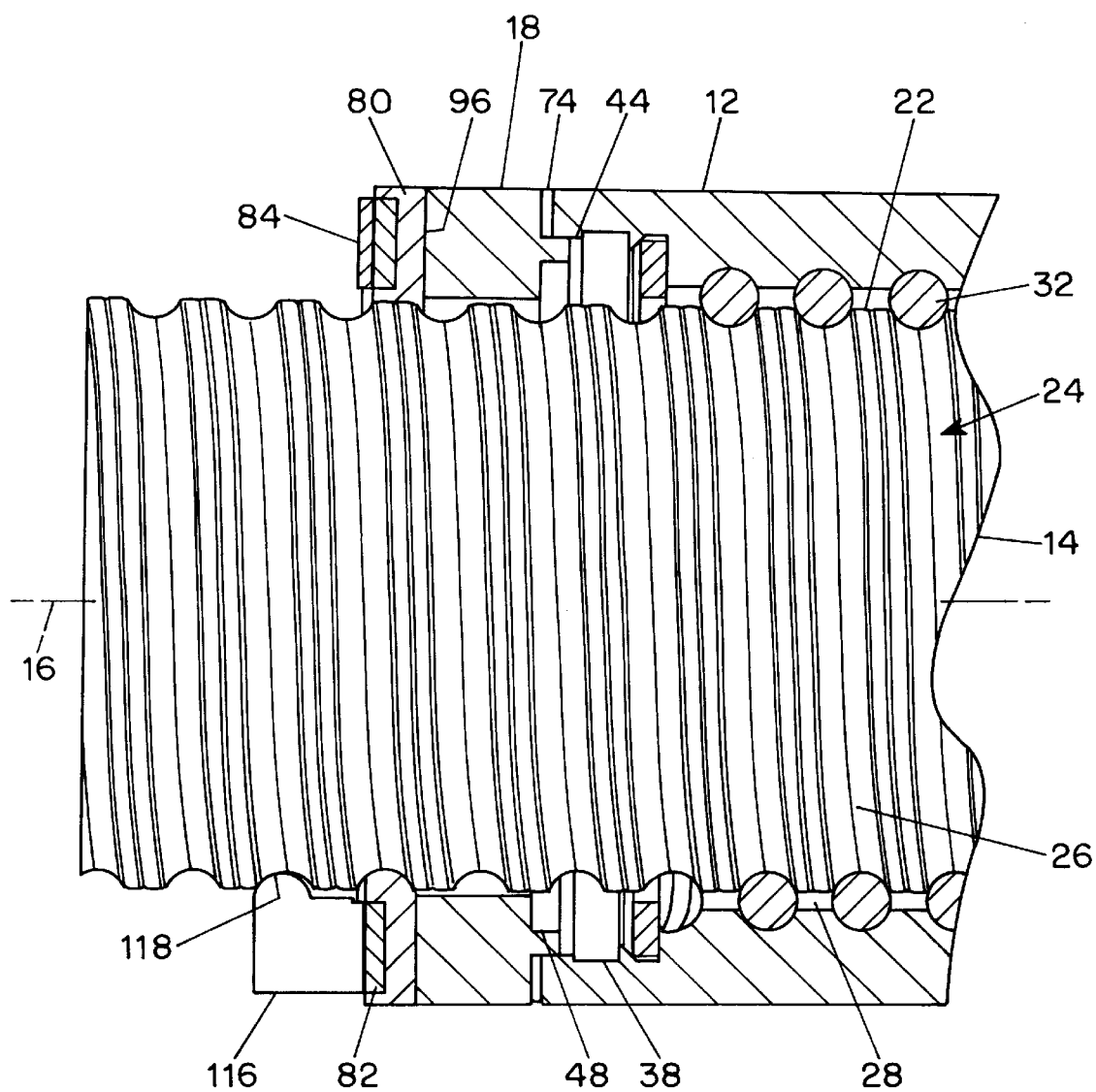
FIG. 3 shows a view of the mounting of the spindle drive unit of FIG. 1 in a view similar to that of FIG. 2.

An alternative to assemble the spindle drive unit 10 is to fix the adapter 18 on the nut 12 mounted on the spindle 14, and then to insert the spindle 14 in its spindle bearings before the wiper assembly 20 is mounted on the adapter 18. In effect, the wiper assembly 20 can be mounted on when the spindle 14 is already mounted. Because of the separating slot 102 the sealing ring 80 can be bent apart and radially applied on the spindle 14. By manual alignment the engagement of the threaded profile 94 with the thread 24 of the spindle 14 can be achieved easily. Since the cover plate 82 is formed as a partial ring, it can radially be put on the spindle 14 with ease. The same applies to the semicircular groove scraper 84. The components of the wiper assembly are fixed to the adapter 18 by means of the fastening screws 54. The adapter 18 itself is fixed to the nut 12. The spindle drive unit 10 can be disassembled in the reverse order. In particular when only the sealing ring 80 is worn-out and is to be exchanged this last procedure is advisable as neither the spindel 14 has to be removed from it, spindle bearings nor the adapter 18 has to be dismounted from the nut 12. FIG. 3 shows the assembled state of the spindle drive unit 10.

As regards the description of FIGS. 8–16 the same reference numerals, supplemented by a small letter, are used as in FIGS. 1 to 7, as far as the same components or components having the same effect are addressed. In order to avoid repetitions substantially only the differences as regards the embodiment of FIGS. 1–7 are described. Apart from that reference is made to the foregoing description of FIGS. 1 to 7.

Figure 8:
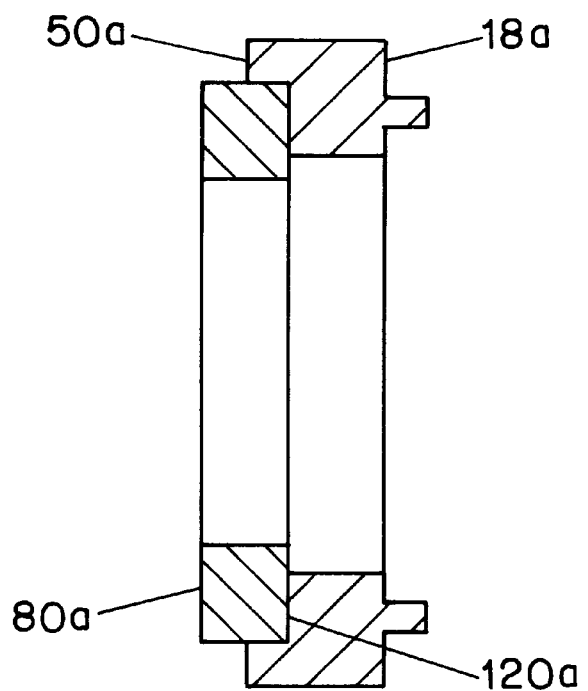
FIG. 8 shows a modification of a sealing ring and an adapter.

FIG. 8 shows an alternative of pretensioning the sealing ring 80a. It is not pretensioned, as is the case in the embodiment of FIGS. 1 to 7, by a separate pretensioning member, i.e. in this case the pretensioning clamp 104, but is inserted in a circular pretensioning recess 120a recessed in the mounting surface 50a of the adapter 18a. The diameter of said pretensioning recess 120a is somewhat smaller than the external diameter of the sealing ring 80a in its relaxed state. In order to insert the sealing ring 80a into the pretensioning recess 120a of the adapter 18a it is compressed by hand and then pushed into the pretensioning recess 120a. Within the pretensioning recess 120a the sealing ring 80a is fixed in both the radial and the axial direction.

Figure 9:
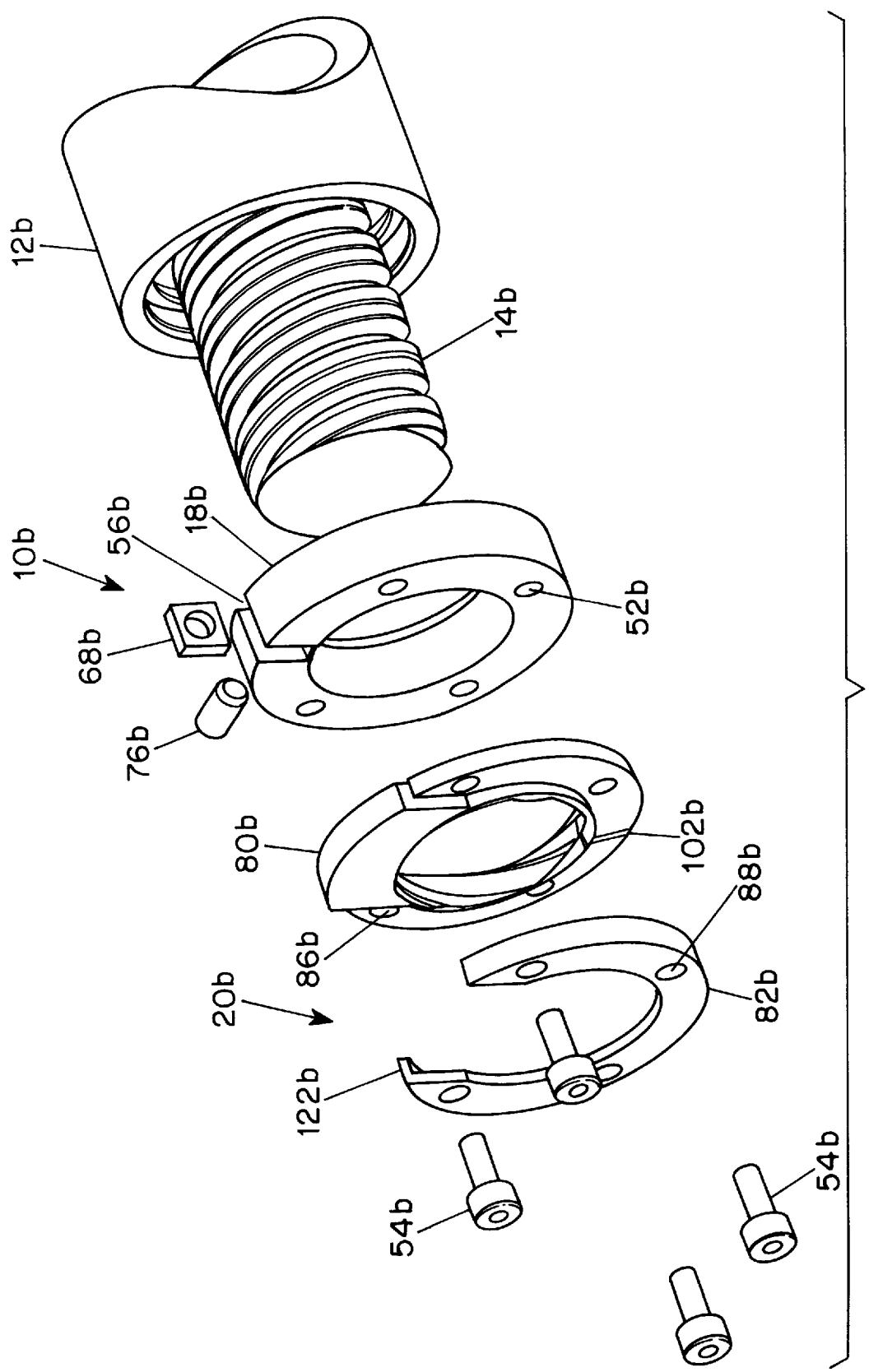
FIG. 9 shows a perspective exploded view of a further embodiment of the spindle drive unit according to the invention.

FIG. 9 shows a further embodiment in which the wiper assembly 20b only comprises the sealing ring 80b, however, no groove scraper. This is possible without further ado as long as no contaminations of the spindle 14b are to be expected which require a secondary wiper. In this embodiment the pretension of the sealing ring 80b is carried out in that the sealing ring 80b is inserted into a sleeve portion 122b which axially connects to the cover sheet 82b. The sleeve portion 122b can be of one piece with the cover plate 82b, e.g. in the form of a bent sheet metal part, but may also be fixed to the cover plate 82b as a separately manufactured component, e.g. by glueing or welding. The internal diameter of the sleeve portion 122b is again somewhat smaller than the external diameter of the sealing ring 80b in the relaxed state, so that the separating slot 102b of the sealing ring 80b is constricted and the sealing ring 80b is radially pretensioned when the cover plate 82b together with the sleeve portion 122b is placed on the sealing ring 80b. A pretensioning member separate from the cover plate 82b, such as the pretensioning clamp 104 in FIGS. 1 and 7, is not necessary in the embodiment of FIG. 9. The spindle drive unit 10b of FIG. 9 is assembled and disassembled analogously to the embodiment of FIGS. 1 to 7.

Figure 10:
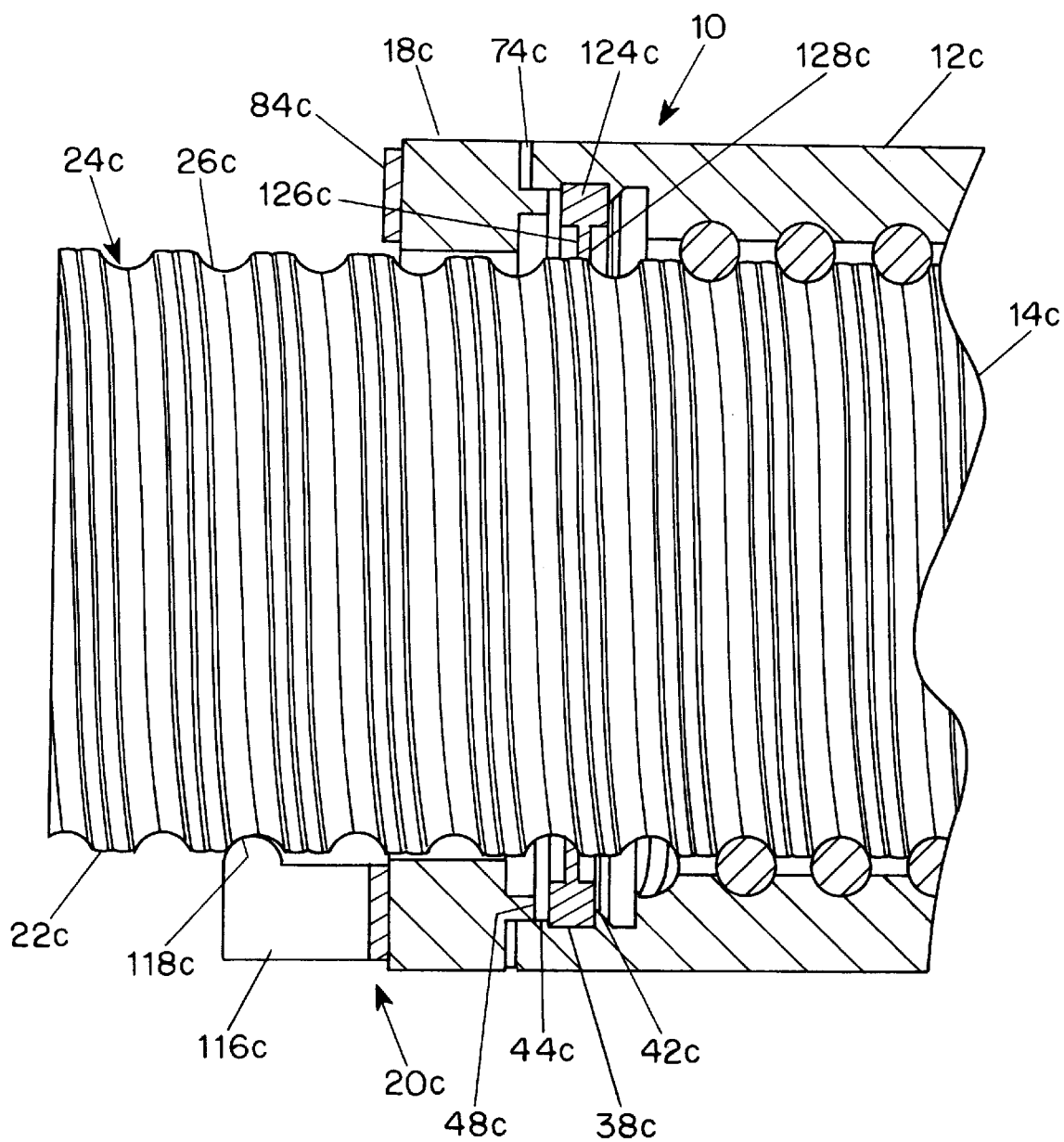
FIG. 10 shows a further embodiment of the spindle drive unit according to the invention in a view similar to that of FIG. 3.

FIG. 10 shows a spindle drive unit 10c in which the wiper assembly 20c has no sealing ring but only a groove scraper 84c. The groove scraper 84c is fixed to the adapter 18c by means of two fastening screws as can easily be seen in FIG. 1. Thus two fixation bores of the adapter 18c remain vacant. Since the groove scraper 84c only has the effect of a secondary wiper and only removes rough contaminations from the spindle thread 24c, a sealing ring 124c separated from the wiper assembly 20c is inserted into the annular groove 38c of the nut 12c in order to achieve sufficient sealing of the nut 12c with regard to the spindle 14c. The sealing ring 124c is axially fixed in the annular groove 38c by the annular webs 42c and 44c. The sealing ring 124c preferably consists of an elastomer material and has a sealing lip 126c radially projecting to the inside. The sealing lip 126c has a lip edge 128c which sealingly abuts at the external circumferential surface 22c of the spindle 14c. The sealing lip 126c may axially flexibly deflected so that it optimally adapts to the external circumferential surface 22c of the spindle 14c. The sealing ring 124c is preferably mounted with radial pretension to improve the sealing effect. Attention has to be paid to the fact that the mounting of the adapter 18c on the nut 12c is not impeded by the sealing ring 124c since the support rib 48c of the adapter 18c does not axially extend beyond the annular web 44c of the nut 12c.

Figure 11:
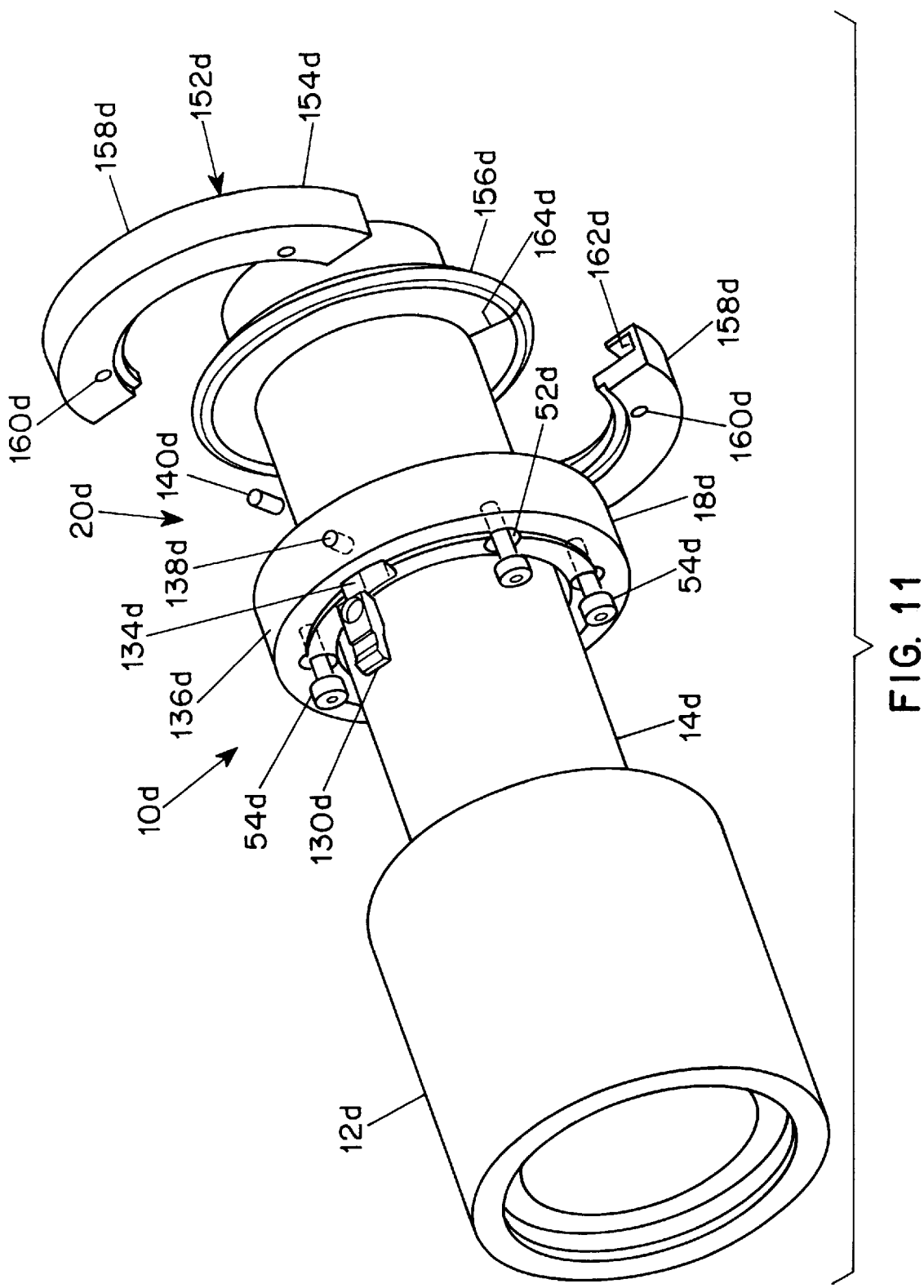
FIG. 11 shows a perspective exploded view of a further embodiment of the spindle drive unit according to the invention.
Figure 12:
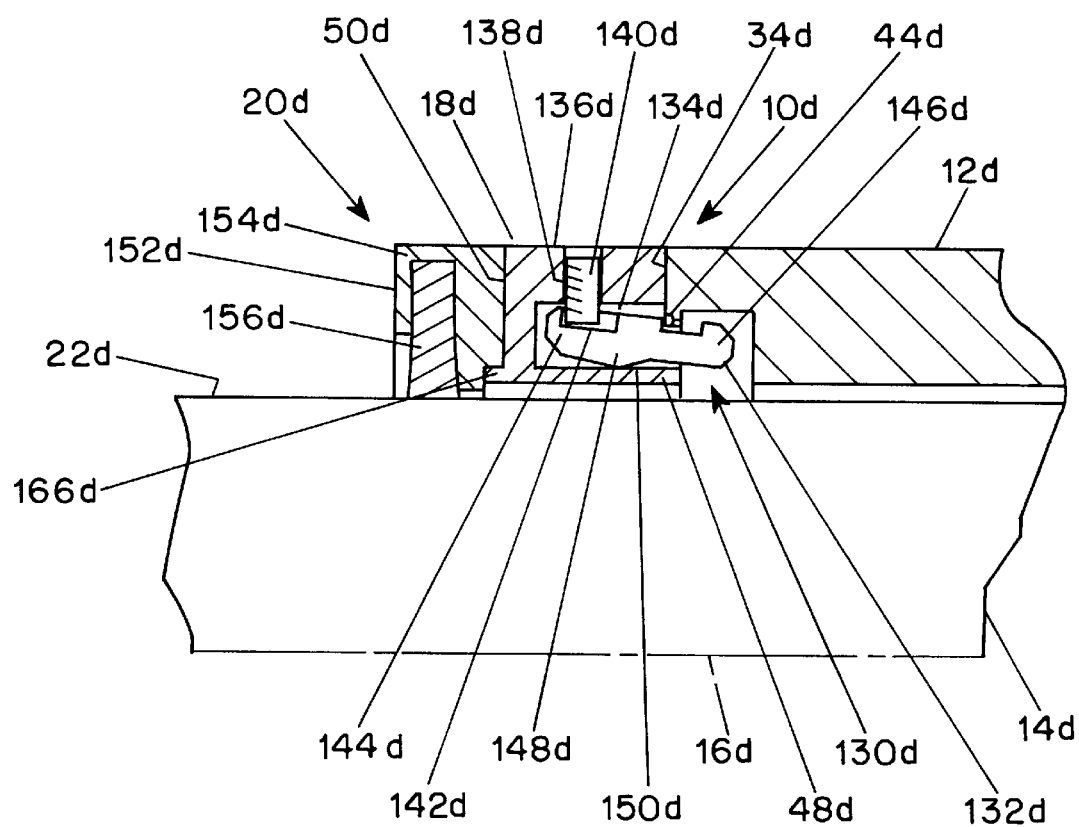
FIG. 12 shows a longitudinal section of a portion of the spindle drive unit of FIG. 11.

FIGS. 11 and 12 show a spindle drive unit 10d in which the adapter 18d, unlike in FIGS. 1 to 10, is clampable to the nut 12d by means of a hook arrangement 130d. In the illustrated embodiment the hook arrangement 130d comprises two diametrically opposing fixation hooks 132d of which only one can be seen in FIG. 11. The fixation hooks 132d are each inserted into an accommodating pocket 134d of the adapter 18d from the side of the adapter 18d axially facing the nut 12d. In the region of the accommodating pocket 134d a radial threaded bore 138d extending from the external circumferential surface 136d of the adapter 18d to the accommodating pocket 134d is worked in, which serves to accommodate a headless screw 140d. FIG. 12 shows that the headless screw 140d may be screwed in the threaded bore 138d so that it engages with a recess 142d of the fixation hook 132d which lies in the area of a pivot end 144d of the fixation hook 132d which axially opposes a hook end 146d of the fixation hook 132d. The fixation hook 132d has a pivot portion 148d which rests on a bottom surface 150d of the accommodating pocket 134d. By means of further screwing in of the headless screw 140d into the threaded bore 138d, the fixation hook 132d is pivotal from a release position shown in FIG. 12 into a hook position in which the fixation hook 132d with its hook end 146d is hooked behind the annular rib 44d which is adjacent to the front surface 34d of the nut 12d. Then, the adapter 18d is axially fixed to the nut 12d in this hook position. To remove the adapter 18d from the nut 12d the headless screw 140d is released which leads to the fact that the fixation hook 132d tips back into its release position shown in FIG. 12. Then, the adapter 18d can be axially removed from the nut 12d.

In FIG. 11 it can be seen that the fixation bores 52d of the adapter 18d axially traverse the adapter 18d and the fastening screws 54d are inserted from the side of the adapter 18d axially facing the nut 12d.

In the spindle drive unit 10d of FIGS. 11 and 12 the wiper assembly 20d comprises a wiper brush 152d, made up of a two-part brush housing 154d and a brush insert 156d. The ring-shaped brush housing 154d may be assembled of two semi-circular housing halves 158d and has threaded bores 160d which may be axially aligned with the fixation bores 52d of the adapter 18d and may be screwed into the fastening screws 54d in order to attach the wiper brush 152d to the mounting surface 50d of the adapter 18d. The brush insert 156d is insertable into a ring-shaped brush accommodation 162d in the brush housing 154d. It is slit as is indicated in FIG. 11. Thus, the brush insert 156d can be applied on the spindle 14d by bending it apart. Thereafter, the two housing halves 158d are closed around the brush insert 156 to form the brush housing 154d. FIG. 12 shows that the adapter 18d has a ring-shaped centering projection 166d on its side axially facing the wiper brush 152d which serves to center to brush housing 154d.

The spindle drive unit 10d of FIGS. 11 and 12 can be assembled such that the adapter 18d is premounted with the wiper brush 152d to form a constructional unit, said constructional unit is then pushed onto the spindle 14d from one end of the spindle. Afterwards the spindle 14d together with the nut 12d attached to it is installed in the spindle bearings at its spindle ends. Alternatively it is also possible to apply the adapter 18d on the spindle 14d, however, without fixing it to the nut 12d. Then the spindle 14d is installed in its spindle bearings whereupon the brush insert 156d is radially applied on the spindle 14d and the brush housing 154d is attached. The wiper brush 152d is then screwed to the adapter 18d, this constructional unit is then axially pressed on the nut 12d and, by means of screwing in the headless screws, hooked to the nut 12d. The spindle drive unit 10d can be disassembled in the reverse order.

Now reference is made to the embodiment of FIG. 13 to 16. There, in the adapter 18e the attachment screw 76e is not screwed into a nut separately inserted into the slot 56e but into a screw thread 168e formed in the tangential bore 66e. A sink recess 170e is formed in the slot defining surface 60e. When the attachment screw 76e is screwed into the screw thread 168e of the tangential bore 66e to clamp the adapter 18e to the nut, the leading end of the attachment screw 76e bridging the slot 56e is supported in the sink recess 170e, which leads to a widening of the slot 56e when the attachment screw 76e is screwed in further.

Figure 13:
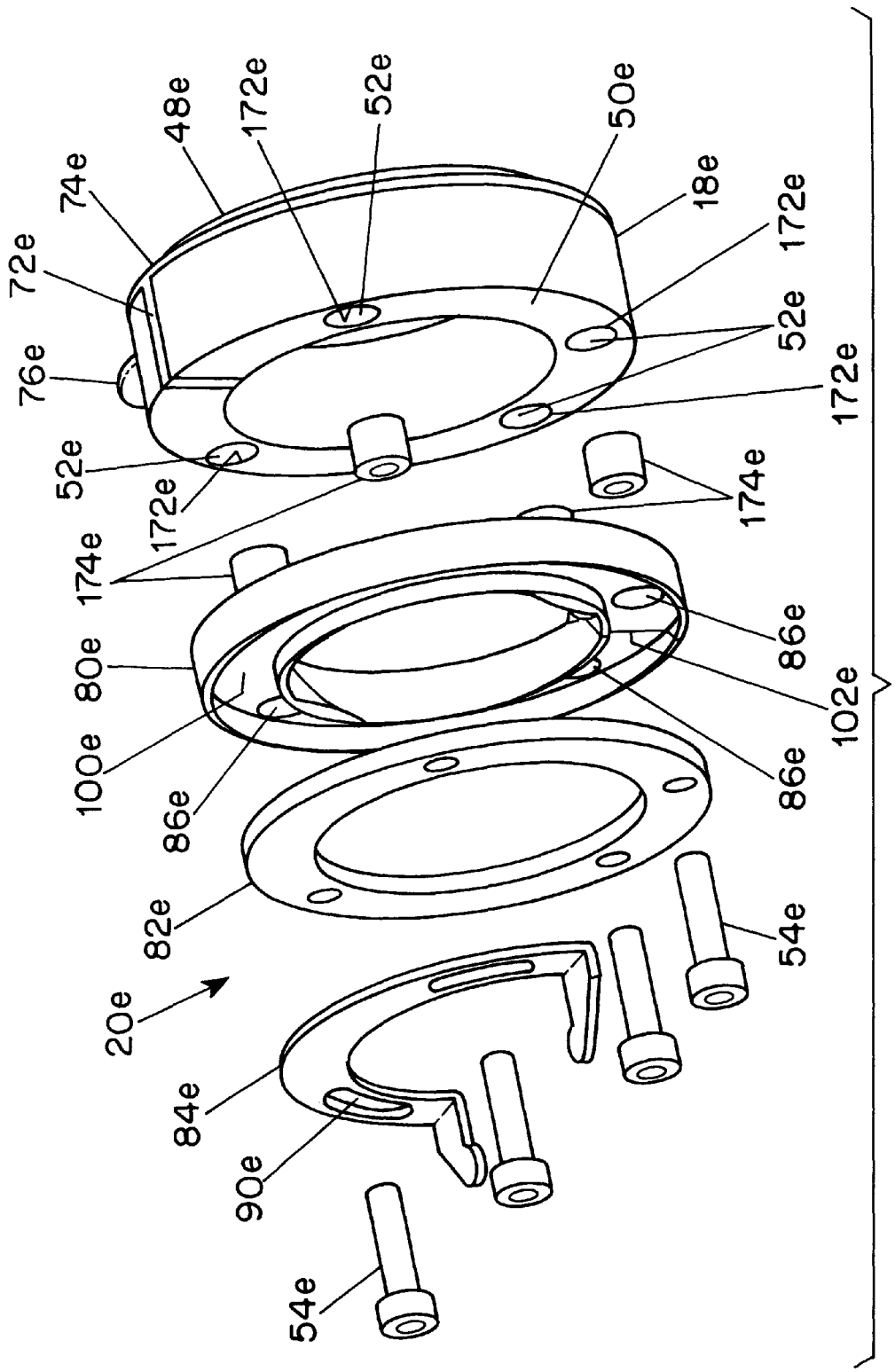
FIG. 13 shows a perspective exploded view of a further embodiment of a wiper assembly and an adapter.
Figure 14:
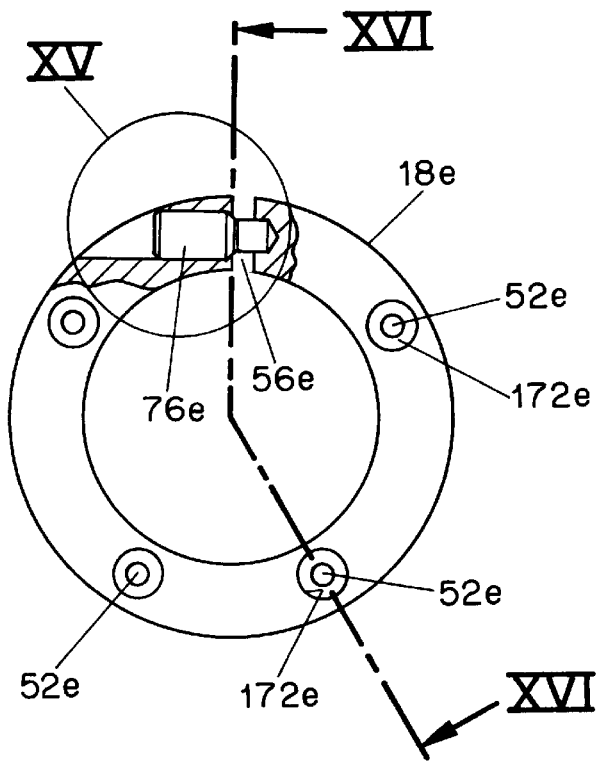
FIG. 14 shows a front view of the adapter of FIG. 13 from its side remote from the nut.
Figure 16:
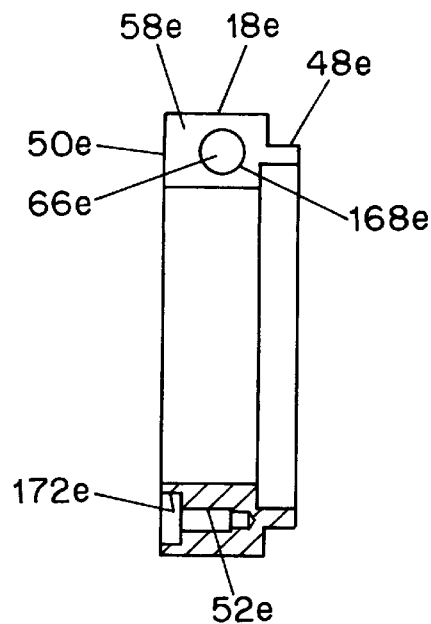
FIG. 16 shows a section along line XVI—XVI of FIG. 14.
Figure 15:
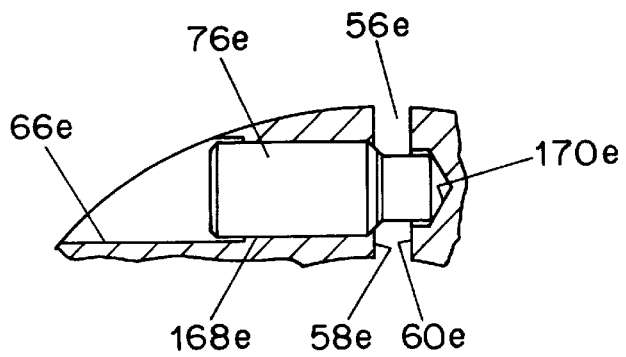
FIG. 15 shows an enlarged view of the portion designated with XV in FIG. 14.

FIG. 16 shows that the blind bores 52e in the adapter 18e are formed as step bores and each have a step-like extension 172e opening into the mounting surface 50e. In these step-like extensions 172e distance sleeves 174e (s. FIG. 13) are inserted, the length of which is larger than the depth of the step-like extensions 172e. When the distance sleeves 174e are inserted in the step extensions 172e they project from the mounting surface 50e of the adapter 18e. The diameter of the through bores 86e in the sealing ring 80e corresponds to the external diameter of the distance sleeves 174e. In the relaxed state of the sealing ring 80e the circumferential distance of the two through bores 86e located on both sides of the separating slot 102e is somewhat larger than the circumferential distance of the two opposing step extensions 172e of the adapter 18e. For mounting the wiper assembly 20e on the adapter 18e first of all the sealing ring 80e can be applied on the distance sleeves 174e inserted in the adapter 18e. Thereby the sealing ring 80e is slightly compressed in the region of the separating slot 102e. This leads to a radial inherent pretension of the sealing ring 80e which keeps it at the adapter 18e without falling off when being released from the person responsible for mounting. This facilitates the mounting process insofar as the person responsible for mounting has both hands free to attach the sealing ring 82e and the groove scraper 84e to the fastening bolts 54e and screw the latter ones through the sealing ring 80e and the distance sleeves 174e into the adapter 18e. The radial constriction when applying the sealing ring 80e onto the distance sleeves 174e can be so large that the desired radial pretension of the sealing ring 80e with regard to the spindle is achieved.

The length of the distance sleeves 174e is preferably measured so that they slightly project into the recess 100e of the sealing ring 80e into which the cover plate 82e is inserted. When mounting the wiper assembly 20e the cover plate 82e is pressed against the distance sleeves 174e which, in turn, are supported by the step extensions 172e of the adapter 18e. When tightening the fastening screws 54e the sealing ring 80e which is preferably made of plastics material is not axially pinched. As the adapter 18e, the distance sleeves 174e and the cover plate 82e are preferably made of metal which is not endangered of being pinched the fastening screws 54e can nevertheless be tightened to such an extent that they do not loosen even when subjected to strong operational vibrations. Further when determining a suitable tightening torque for the fastening screws 54e the dependence on temperature of the material hardness of the sealing ring 80e does not have to be taken into account.

What is claimed is:

1. A spindle drive unit, comprising
   a spindle having a spindle axis and an external circumferential surface,
   a nut embracing said spindle and being in threaded engagement with said spindle,
   at least one wiper assembly comprising at least one wiper member in wiping engagement with said external circumferential surface of said spindle, and
   an adapter being arranged axially between said nut and said wiper assembly,
   said nut, said wiper assembly and said adapter being formed independently from each other,
   said adapter being an annular ring member and being directly and removably fastenable to said nut at an axial end portion thereof in an axially and rotationally fixed manner,
   said nut having an internal circumferential surface at said axial end portion serving as a support seat for said adapter, said adapter having an axially projecting annular rib serving as a support projection engageable with the support seat, and said adapter having a radially and axially extending slot and a bore orthogonal to and opening to the slot, and said adapter being fastenable to said nut by an expander associated with the bore and the slot for widening the slot to expand the adapter radially outwardly go as to engage the support projection on the adapter with the support seat on the nut, whereby the adapter is frictionally retained on the nut,
   said wiper assembly being directly and removably fastenable to said adapter in an axially and rotationally fixed manner, said wiper assembly thus being indirectly and removably fastenable to said nut.

2. Spindle drive unit according to claim 1,
   wherein at least said wiper member may be mounted on and dismounted from said nut in a mounting state of said nut in which said nut is mounted on said spindle.

3. Spindle drive unit according to claim 2,
   wherein said adapter, in said mounting state of said nut, may also be mounted on or dismounted from said nut.

4. Spindle drive unit according to claim 1,
   wherein at least a part of said wiper assembly including said wiper member and said adapter may be premounted to form a constructional unit and may be attached to said nut in the form of said constructional unit.

5. Spindle drive unit according to claim 4,
   wherein said premounted constructional unit which comprises said wiper member and said adapter may be mounted on and dismounted from said nut in a mounting state of said nut in which said nut is mounted on said spindle.

6. Spindle drive unit according to claim 1,
   wherein first cooperating axial abutment means are provided on said adapter and on said nut, respectively, and define an axial position of said adapter relative to said nut.

7. Spindle drive unit according to claim 1,
   wherein said wiper member is connectable with said adapter in an axially fixed manner.

8. Spindle drive unit according to claim 7,
   wherein second cooperating axial abutment means are provided on said wiper assembly and on said adapter, respectively, and define an axial position of said wiper member relative to said adapter.

9. Spindle drive unit according to claim 1,
   wherein said adapter is adapted for selectively fastening different wiper assemblies differing with respect to the number of wiper members.

10. Spindle drive unit according to claim 9,
    wherein for attaching a wiper assembly said adapter has attachment locations which are equal for different wiper assemblies.

11. Spindle drive unit according to claim 1,
    wherein said wiper assembly comprises at least two physically distinct wiper members.

12. Spindle drive unit according to claim 11,
    wherein at least a part of said wiper members are in axially consecutive wiping engagement with said external circumferential surface of said spindle.

13. Spindle drive unit according to claim 12,
    wherein two wiper members in axially consecutive wiping engagement with said external circumferential surface of said spindle differ with respect to their wiping effect.

14. Spindle drive unit according to claim 13,
    wherein a wiper member which is in wiping engagement with said external circumferential surface of said spindle more remote from an axial center portion of said nut forms a secondary wiper with a coarse wiping effect and a wiper member which is in wiping engagement with said external circumferential surface of said spindle closer to said axial center portion of said nut forms a primary wiper with a fine wiping effect.

15. Spindle drive unit according to claim 1,
    wherein in said axial end portion of said nut at least one additional wiper member separate from said wiper assembly fastened to said adapter is fixed or may be fixed to said nut.

16. Spindle drive unit according to claim 15,
    wherein said additional wiper member is fixed or may be fixed to said nut closer to an axial center portion of said nut than said wiper assembly fastened to said adapter.

17. Spindle drive unit according to claim 15,
    wherein for accommodating said additional wiper member a wiper member receiving groove is formed on said nut.

18. Spindle drive unit according to claim 17,
    wherein said wiper member receiving groove is formed as an annular groove and said additional wiper member is formed as a sealing ring.

19. Spindle drive unit according to claim 1,
wherein said adapter has a mounting surface axially directed away from said nut for fixing said wiper assembly.

20. Spindle drive unit according to claim 19,
wherein a plurality of axial fixation bores are formed in said mounting surface for accommodating fastening bolts serving for the fixation of said wiper assembly to said mounting surface of said adapter, said fixation bores being distributed along the circumferential direction with respect to the spindle axis.

21. Spindle drive unit according to claim 20,
wherein at least a part of said fixation bores are formed as blind holes.

22. Spindle drive unit according to claim 1, wherein said expander includes a width variation screw which is received in the bore in said adapter, which bore opens into a slot defining surface of said slot.

23. Spindle drive unit according to claim 22,
wherein in said slot a physically distinct threaded nut is retained which may be brought into threaded engagement with said width variation screw.

24. Spindle drive unit according to claim 23,
wherein said threaded nut is arranged in a recess in a slot defining surface of said slot.

25. Spindle drive unit according to claim 22, wherein the bore is threaded and a tip end of the width variation screw engages a surface of said slot opposite said slot defining surface of said slot.

26. Spindle drive unit according to claim 1, wherein said adapter is made of metal.

27. Spindle drive unit according to claim 26, wherein the metal is aluminum.

28. Spindle drive unit according to claim 1,
wherein an abutment surface of said adapter provided for abutment on said nut is at least partly coated with a cover material.

29. Spindle drive unit according to claim 28,
wherein said cover material comprises vulcanized rubber or injected plastics material.

30. Spindle drive unit according to claim 1,
wherein said slot is at least partly filled with a sealing material, preferably with a deformable sealing material.

31. Spindle drive unit according to claim 1, wherein said at least one wiper member is a sealing ring which is in sealing engagement with said external circumferential surface of said spindle substantially over its entire internal circumference.

32. Spindle drive unit according to claim 31,
wherein said sealing ring is mounted with a pretension radially, biassing said wiper ring against said external circumferential surface of said spindle.

33. Spindle drive unit according to claim 32,
wherein said sealing ring is circumferentially separated by a separation and may be biased by pretensioning means constricting said separation.

34. Spindle drive unit according to claim 33,
wherein said separation is formed by a substantially axially oriented separation slit or separation cut being inclined relative to the radial direction.

35. Spindle drive unit according to claim 33,
wherein said pretensioning means comprise a pretensioning member having a pretensioning recess into which said wiper ring is insertable in order to be pretensioned.

36. Spindle drive unit according to claim 35,
wherein said pretensioning member is formed physically distinct from said adapter and comprises a pretensioning sleeve into-which said wiper ring is insertable.

37. Spindle drive unit according to claim 35,
wherein said pretensioning member is formed by said adapter and said pretensioning recess is formed on said adapter.

38. Spindle drive unit according to claim 31,
wherein said sealing ring is made of plastics material.

39. Spindle drive unit according to claim 31,
wherein, when said external circumferential surface of said spindle is formed with a threaded profile, said sealing ring has a complementary profile at its internal circumference engaging with said threaded profile.

40. Spindle drive unit according to claim 31,
wherein said sealing ring may be fixed to said adapter by means of fastening members and wherein support formations are assigned to said adapter and to said sealing ring allowing that said wiper ring is supported on said adapter even before attaching said fastening members.

41. Spindle drive unit according to claim 40,
wherein said support formations comprise at least two support members which are circumferentially distributed with respect to the spindle axis, are arranged on one of the sealing ring and adapter, and which project in the axial direction towards the other of the sealing ring and adapter, and which are axially insertable into an opposing support recess in said other of the sealing ring and adapter.

42. Spindle drive unit according to claim 41,
wherein said sealing ring is slit and wherein said support members and said support recesses are localized on both members in the circumferential direction on both sides of the slot of said sealing ring such that said sealing ring may be supported on said adapter with radial constriction.

43. Spindle drive unit according to claim 1,
wherein said wiper member is axially traversed by at least two through bores for accommodating-fastening bolts serving for fixing said wiper member to said adapter, said through bores being circumferentially distributed with regard to the spindle axis.

44. Spindle drive unit according to claim 43,
wherein said wiper member is made of material endangered of being pinched, in particular plastics material, and in the through bores of which a spacer sleeve, preferably made of metal, is inserted which on the one end is supported by said adapter and on the other end is adapted for receiving clamping forces exerted by the respective fastening bolt.

45. Spindle drive unit according to claim 1,
wherein said wiper assembly comprises a groove scraper as a wiper member which has at least one scraping projection engaging with a threaded groove in said external circumferential surface of said spindle.

46. Spindle drive unit according to claim 1,
wherein said wiper assembly comprises at least one cover member for said at least one wiper member.

47. Spindle drive unit according to claim 46,
wherein said cover member is formed as a cover disk or plate, preferably made of sheet metal.

48. Spindle drive unit according to claim 1,
wherein said spindle has at least one threaded groove in its external circumferential surface extending helically about said spindle axis.

49. Spindle drive unit according to claim 1,
wherein said spindle drive unit is formed as a rolling element screw drive unit, in particular ball screw drive unit.

50. Spindle drive unit according to claim 49,
wherein in an internal circumferential surface of said nut at least one rolling-element-containing nut groove is formed which extends helically about said spindle axis and comprises two end portions, said nut groove together with said external circumferential surface of said spindle defining a helical rolling element path extending between said two end portions, said helical rolling element path being supplemented by a rolling element return path in said nut extending between said two end portions to form a closed rolling element circulating path, said rolling element circulating path being equipped with an endless row of rolling elements which on the one hand engage with said nut groove and on the other hand with a helical track surface of said external circumferential surface of said spindle.

51. Spindle drive unit according to claim 1, wherein said adapter is adapted for selectively fastening different wiper assemblies differing with respect to the configurations of the wiper members.

* * * * *

UNITED STATES PATENT AND TRADEMARK OFFICE
CERTIFICATE OF CORRECTION

PATENT NO. : 6,199,440 B1
DATED : March 13, 2001
INVENTOR(S) : Greubel et al.

It is certified that error appears in the above-identified patent and that said Letters Patent is hereby corrected as shown below:

Title page,
Item [56], References Cited, FOREIGN PATENT DOCUMENTS,
"57-85648 11/1955 (JP)"should read -- 57-85648 11/1980 (JP) --

Column 19,
Line 53, "radially," should read -- radially --

Column 20,
Line 4, "into-which" should read -- into which --
Line 40, "accommodating-fastening" should read -- accommodating fastening --

Column 21,
Line 3, "ball" should read -- a ball --

Column 2,
Line 9, "DT 20 01 558" should read -- 3,643,521 --
Line 12, "preconditons" should read -- preconditions --
Line 43, "possiblities" should read -- possibilities --
Line 50, "possiblities" should read -- possibilities --
Line 53, "funciton" should read -- function --

Column 4,
Line 12, "the" (third occurrence) should be deleted

Column 5,
Line 14, "cirumferentially" should read -- circumferentially --

Column 6,
Line 12, "cirumferentially" should read -- circumferentially --; and
"oppposite" should read -- opposite --
Line 36, "end." should read -- hand. --
Line 63, "member" should read -- members --

UNITED STATES PATENT AND TRADEMARK OFFICE
CERTIFICATE OF CORRECTION

PATENT NO. : 6,199,440 B1
DATED : March 13, 2001
INVENTOR(S) : Greubel et al.

It is certified that error appears in the above-identified patent and that said Letters Patent is hereby corrected as shown below:

Column 7,
Line 8, "the" (second occurrence) should be deleted
Line 46, "proctection" should read -- protection --
Line 54, "ball" should read -- a ball --

Column 8,
Line 43, "profile" should read -- a profile --
Line 45, "rotable" should read -- rotatable --

Column 10,
Line 14, "relativ" should read -- relative --
Line 57, "elastical" should read -- elastic --
Line 64, "losening" should read -- loosening --

Column 12,
Line 32, "abuting" should read -- abutting --

Column 13,
Line 11, "is" (second occurrence) should read -- it --
Line 27, "tolarances" should read -- tolerances --

Column 14,
Line 20, "spindel" should read -- spindle --
Line 52, "sheet" should read -- plate --

UNITED STATES PATENT AND TRADEMARK OFFICE
CERTIFICATE OF CORRECTION

PATENT NO. : 6,199,440 B1
DATED : March 13, 2001
INVENTOR(S) : Greubel et al.

It is certified that error appears in the above-identified patent and that said Letters Patent is hereby corrected as shown below:

Column 15,
Line 17, "may" should read -- may be --

Column 16,
Line 28, "FIG." should read -- FIGS. --

Signed and Sealed this

Eighteenth Day of December, 2001

Attest:

JAMES E. ROGAN
*Attesting Officer*     *Director of the United States Patent and Trademark Office*